(12) United States Patent
Branham et al.

(10) Patent No.: US 6,302,549 B1
(45) Date of Patent: Oct. 16, 2001

(54) MIRROR MOUNTING ASSEMBLY WITH BIAXIAL ADJUSTABILITY

(75) Inventors: Michael D. Branham, Blythewood; Kenneth D. Sailer, Columbia, both of SC (US)

(73) Assignee: Lang-Mekra North America, LLC, Ridgeway, SC (US)

(*) Notice: Subject to any disclaimer, the term of this patent is extended or adjusted under 35 U.S.C. 154(b) by 0 days.

(21) Appl. No.: 09/390,971

(22) Filed: Sep. 7, 1999

(51) Int. Cl.$^7$ .................................................. G02B 7/182
(52) U.S. Cl. ........................... 359/871; 359/872; 359/875
(58) Field of Search .................................... 359/871, 872, 359/875; 248/468, 478, 479

(56) References Cited

U.S. PATENT DOCUMENTS

| | | |
|---|---|---|
| D. 407,361 | 3/1999 | Lang . |
| 2,652,648 | 9/1953 | Morley . |
| 3,375,053 | 3/1968 | Ward . |
| 3,522,584 | 8/1970 | Talbot . |
| 3,642,344 | 2/1972 | Corker . |
| 3,687,443 | 8/1972 | Anderson . |
| 3,889,915 | 6/1975 | Hashigucki et al. . |
| 4,174,823 | 11/1979 | Sutton et al. . |
| 4,349,247 | 9/1982 | Koyama et al. . |
| 4,351,521 | 9/1982 | Erdos . |
| 4,500,063 * | 2/1985 | Schmidt et al. ................... 248/475.1 |
| 4,555,166 | 11/1985 | Enomoto . |
| 4,693,571 | 9/1987 | Kimura et al. . |
| 4,696,555 | 9/1987 | Enomoto . |
| 4,764,004 | 8/1988 | Yamada et al. . |
| 4,818,090 | 4/1989 | Righi . |
| 4,824,065 | 4/1989 | Manzoni . |
| 4,867,408 | 9/1989 | Ozaki . |
| 4,877,214 | 10/1989 | Toshiaki et al. . |
| 4,915,493 | 4/1990 | Fisher et al. . |
| 4,957,359 | 9/1990 | Kruse et al. . |
| 4,991,950 | 2/1991 | Lang et al. . |
| 5,363,245 | 11/1994 | Borello . |
| 5,363,246 | 11/1994 | Perry et al. . |
| 5,436,769 | 7/1995 | Gilbert et al. . |
| 5,467,230 | 11/1995 | Boddy et al. . |
| 5,568,326 | 10/1996 | Yoshida et al. . |
| 5,604,644 | 2/1997 | Lang et al. . |
| 5,615,054 | 3/1997 | Lang et al. . |
| 5,621,577 | 4/1997 | Lang et al. . |
| 5,938,166 * | 8/1999 | Seichter et al. ....................... 248/479 |

* cited by examiner

Primary Examiner—Mohammad Sikder
(74) Attorney, Agent, or Firm—Dority & Manning, P.A.

(57) ABSTRACT

A mirror mounting assembly is disclosed for mounting a mirror glass to a mounting bar, the mirror mounting assembly including a base member for attachment to the mounting bar and defining a spherical surface, and a first slide member secured to the base member and defining a spherical surface. A mirror housing for supporting the mirror glass is disposed between the first slide member and the base member, the mirror housing defining a first spherical surface contacting the spherical surface of the base member and a second spherical surface opposite the first spherical surface. A second slide member is slidably secured to the base member disposed between the first slide member and the mirror housing, the second slide member defining a first spherical surface contacting the spherical surface of the first slide member and a second spherical surface contacting the second spherical surface of the mirror housing. A first mechanism is provided for limiting relative sliding between the first and second sliding elements to a first given orientation, and a second mechanism is provided for limiting relative sliding between the second sliding element and the mirror housing to a second given orientation perpendicular to the first given orientation.

12 Claims, 5 Drawing Sheets

MIRROR MOUNTING ASSEMBLY WITH BIAXIAL ADJUSTABILITY

BACKGROUND OF THE INVENTION

The present invention generally relates to mirror mounting assemblies, and more particularly relates to mirror mounting assemblies that allow a mirror housing to be biaxially adjusted relative to a mounting bar without undesired rotation.

Many different arrangements are known for mounting external mirrors on vehicles. On large, commercial vehicles, such as trucks and busses, mirrors are often secured within mirror housings mounted so as to extend the mirror out from the vehicle thereby providing a clear view of different areas around the vehicle. Depending on the size and design of the mirror, as well as the area around the vehicle to be observed, different mounting arrangements have been used.

One such type of mounting arrangement includes a bar extending outwardly from the vehicle, often in substantially a U-shape, in which the ends of the U-bar are attached to the side of the vehicle. Alternately, a bar may be attached to the vehicle at only one end, with a mirror housing being disposed at a distal end or central portion, or both, of such bar. In either of such applications, one mounting bar is typically attached to each side of the driver's cab of a truck for placement of at least one mirror housing. These one-piece mounting bar arrangements are often referred to in the industry as "C-loop," to differentiate them from other available types of mounting arrangements made of several interconnected, generally smaller diameter rods that are secured together, often by nuts and bolts. Some one-piece mounting bar arrangements do, however, include additional bracing members for additional support in certain applications. Examples of mirrors mounted on one-piece mounting bars are shown in U.S. Pat. Nos. 4,991,950; 5,110,196; 5,687,035; and 5,798,882 and in U.S. Design Pat. Nos. 385,243; 387,317; and 407,361.

Mirror housings may be attached to the central (upright when installed) portions of the U-bars or to the extending bars in various ways. For example, the bar may pass through the center of the mirror housing, with a clamping mechanism of some type disposed within the housing securing the mirror housing to the bar (see U.S. Pat. No. 5,687,035). Alternately, a mounting mechanism may extend from the mirror housing and be secured to the bar externally of the mirror housing (see U.S. Pat. No. 4,991,950). Both of these methods of attachment provide reliable securing of the mirror housing to the bar.

One-piece mounting bar arrangements generally provide a reliable, vibration-reducing, and sturdy mounting arrangement for mirrors. Also, one-piece mounting bar arrangements beneficially do not require assembly of several smaller rods during manufacture, installation, or repair. Also, one-piece bars favorably provide a visually streamlined styling that many people prefer on vehicles, as compared to the multi-rod designs.

Numerous ways to attaching a mirror housing to mounting bars and achieving mirror glass adjustment have also been proposed. In some applications, the mirror housing is fixed relative to the mounting bar, and at least one actuator disposed within the mirror housing moves the mirror glass relative to the mirror housing. In other applications, the mirror housing is itself movable relative to the mounting bar, and the mirror glass is fixed with respect to the mirror housing. If the mirror housing is movable, it may be moved either manually (i.e., by hand) or by remote control, with at least one actuator being disposed within the mirror housing for moving the mirror housing relative to the mounting bar.

If accidentally bumped or improperly mounted, movable mirror housings could possibly rotate (relative to the mounting bar) from their desired position, potentially impairing the driver's ability to view a desired location. Further, rotated mirror housings could themselves be damaged, or could cause damage to the vehicle or mounting hardware. Also, even slightly rotated mirror housings that still provide safe viewing to the driver are not aesthetically pleasing to the eye.

OBJECTIVES AND SUMMARY OF THE INVENTION

In view of the above, it is a principle objective of the present invention to provide an efficient and simplified vehicle mirror mounting assembly to allow for reliable and efficient manufacture and assembly of vehicle mirror assemblies, and to allow for safe and reliable use of vehicle mirrors.

Other objectives and advantages of the invention will be made clear from the written description and claims that follow, taken in conjunction with the appended drawings, or may be learned from practice of the invention.

To achieve these objectives, and in accordance with the purposes of the invention, as embodied and broadly described and depicted herein, a mirror mounting assembly is disclosed for mounting a mirror glass to a mounting bar, the mirror mounting assembly including: a base member for attachment to the mounting bar and defining a spherical surface; a first slide member secured to the base member and defining a spherical surface; a mirror housing for supporting the mirror glass disposed between the first slide member and the base member, the mirror housing defining a first spherical surface contacting the spherical surface of the base member and a second spherical surface opposite the first spherical surface; a second slide member slidably secured to the base member disposed between the first slide member and the mirror housing, the second slide member defining a first spherical surface contacting the spherical surface of the first slide member and a second spherical surface contacting the second spherical surface of the mirror housing; a first set of mating elements disposed on the spherical surface of the first slide member and the first spherical surface of the second slide member for limiting relative sliding between the first and second slide members to a first given orientation; and a second set of mating elements disposed on the second spherical surface of the second slide member and the second spherical surface of the mirror housing for limiting relative sliding between the second slide member and the mirror housing to a second given orientation perpendicular to the first given orientation.

The first set of mating elements preferably includes a groove disposed in one of the first slide member and the second slide member and a ridge disposed in the other of the first slide member and the second slide member. The second set of mating elements preferably includes a groove disposed in one of the second slide member and the mirror housing and a ridge disposed in the other of the second slide member and the mirror housing.

The mirror mounting assembly may include a compression spring secured to the base member for urging together the first slide member, the second slide member, the mirror housing, and the base member.

The base member may include an extending portion extending nonrotatably through an opening in the first slide member, and the extending portion of the base member may extend nonrotatably through an opening in the second slide member and through an opening in the mirror housing, the extending portion having a square cross-section.

Optionally, at least one actuator may be mounted to the mirror housing and the base member for moving the mirror housing relative to the base member.

In accordance with another aspect of the invention, a mirror mounting assembly for mounting a mirror glass to a mounting bar is disclosed, the mirror mounting assembly including a base member for attachment to the mounting bar and defining a spherical surface, the base member including an extending portion having a non-circular cross-section; a first slide member non-rotatably secured to the extending portion of the base member and defining a spherical surface; a mirror housing for supporting the mirror glass disposed between the first slide member and the base member, the mirror housing defining a first spherical surface contacting the spherical surface of the base member and a second spherical surface opposite the first spherical surface; a second slide member slidably secured to the base member disposed between the first slide member and the mirror housing, the second slide member defining a first spherical surface contacting the spherical surface of the first slide member and a second spherical surface contacting the second spherical surface of the mirror housing, the second slide member defining a slot therethrough extending in a given orientation, the extending portion of the base member passing through the slot and being slidable along the slot but non-rotatable within the slot due to the cross-section of the extending portion; and a set of mating elements disposed on the second spherical surface of the second slide member and the second spherical surface of the mirror housing for limiting relative sliding between the second slide member and the mirror housing to a second given orientation perpendicular to the first given orientation.

In accordance with another aspect, a mirror mounting assembly for mounting a mirror glass to a mounting bar is disclosed, the mirror mounting assembly including a base member for attachment to the mounting bar and defining a spherical surface; a first slide member secured to the base member and defining a spherical surface; a mirror housing for supporting the mirror glass disposed between the first slide member and the base member, the mirror housing defining a first spherical surface contacting the spherical surface of the base member and a second spherical surface opposite the first spherical surface; a second slide member slidably secured to the base member disposed between the first slide member and the mirror housing, the second slide member defining a first spherical surface contacting the spherical surface of the first slide member and a second spherical surface contacting the second spherical surface of the mirror housing; a first means for limiting relative sliding between the first and second slide member to a first given orientation; and a second means for limiting relative sliding between the second slide member and the mirror housing to a second given orientation perpendicular to the first given orientation.

BRIEF DESCRIPTION OF THE DRAWINGS

The present invention will be more fully understood from the following detailed description, taken in conjunction with the accompanying drawings, wherein like reference numerals refer to like parts, and in which.

DETAILED DESCRIPTION OF THE PREFERRED EMBODIMENT

Figure 1:
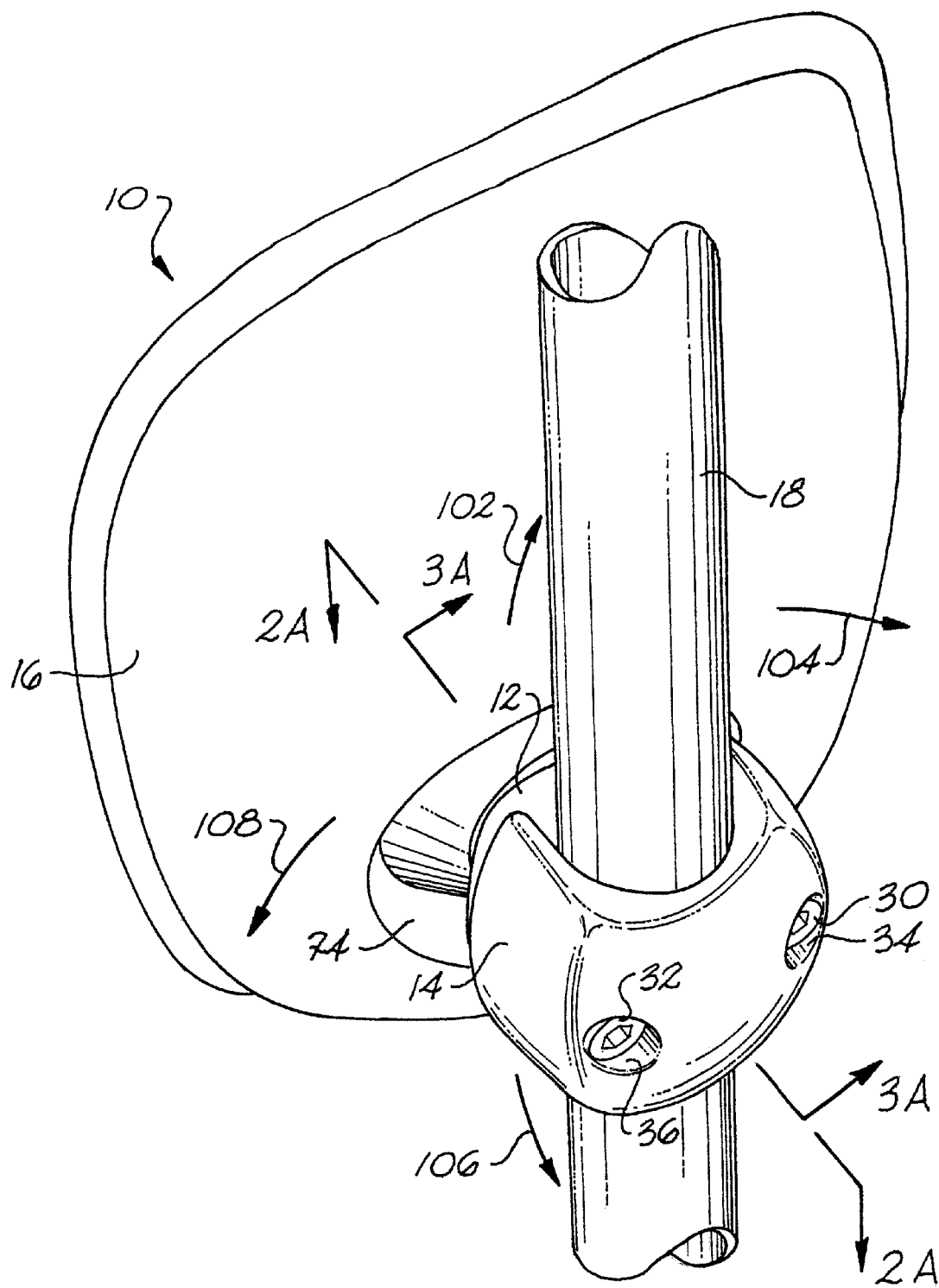
FIG. 1 is a perspective view of a mirror mounting assembly according to the present invention disposed on a mounting bar to be secured to a vehicle.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment or figure can be used on another embodiment or figure to yield yet another embodiment. It is intended that the present invention include such modifications and variations.

One exemplary example of a mirror mounting assembly with biaxial adjustability made according to the present invention is broadly embodied in FIGS. 1–5. As depicted in FIG. 1, the mirror mounting assembly, identified generally with reference numeral 10, includes a base member 12 and a cap member 14. Base member 12 is configured for attachment to a mirror housing 16 and is secured to a mounting bar 18 by cap member 14. Mounting bar 18 is to be secured to a vehicle (not shown) in any conventional manner, and may comprise a U-bar, an extending bar, or any other type of mounting bar.

Base member 12 defines a channel portion 20 for receiving mounting bar 18. As shown in FIG. 2, channel portion 20 is preferably a curved surface, but channel portion 20 may have other cross-sectional shapes within the scope of the invention. For example, channel portion 20 could have a substantially rectangular or trapezoidal cross-section if desired. The cross-sectional shape of channel portion 20 may be dictated or influenced by the method and material of manufacture of base member 12.

Base member 12 includes raised sides 22, 24 flanking channel portion 20. Threaded holes 26, 28 may be defined in sides 22, 24 for receiving threaded bolts 30, 32 to provide one possible means to attach cap member 14 to base member 12. Alternate means may be used to attach cap member 14 to base member 12, such as nuts and bolts, screws, clips, hinges, collet pins, etc. Preferably, cap member 14 is removably and adjustably attached to base member 12 to allow for repair, replacement, or adjustment of mirror housing 16 relative to mounting bar 18. Cap member 14 may include countersunk bores 34, 36 and coaxial holes 38, 40 for receiving and seating threaded bolts 30, 32.

Cap member 14 defines a securing portion 42 for contacting mounting bar 18 and securing base member 12 to mounting bar 18. As shown, securing portion 42 defines a curved cross-section. However, securing portion 42 may have other cross-sectional shapes within the scope of the present invention.

Figure 2A:
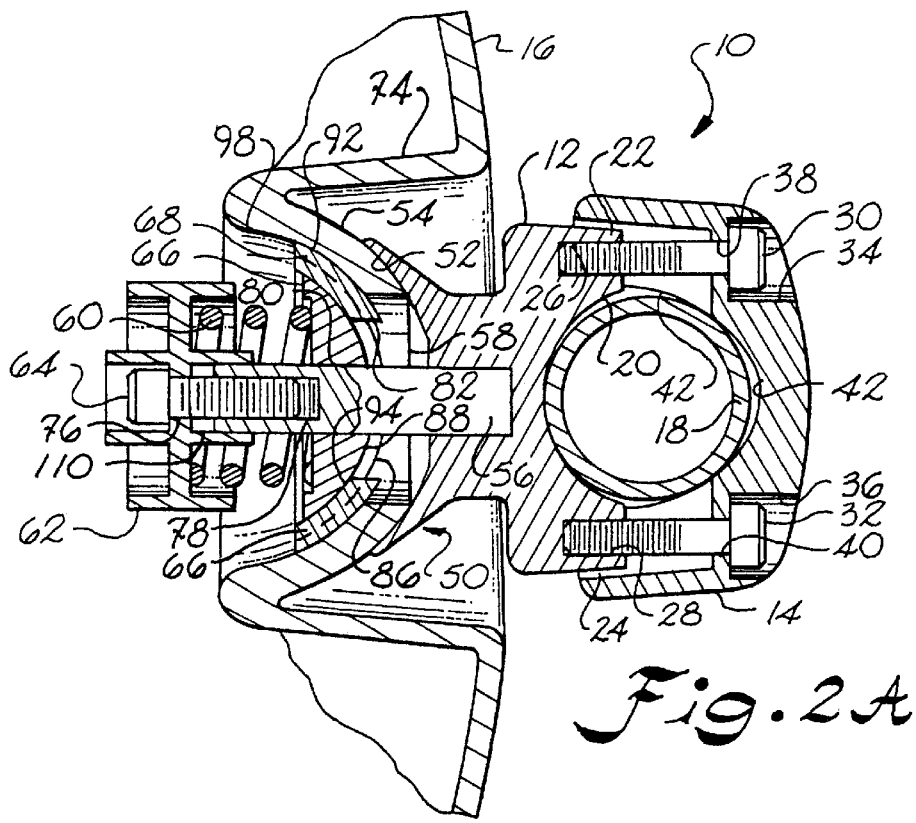
FIG. 2A is a sectional view of the mirror mounting assembly taken along line 2A—2A in FIG. 1.

As shown for example in FIG. 2A, base member 12 includes a mounting portion 50 for contacting and being secured to mirror housing 16 and configured so that mirror housing 16 is pivotable relative to base member 12. Accordingly, mounting portion 50 may in one embodiment include a spherical surface 52 contacting a mating spherical surface 54 of mirror housing 16, and an extending portion in the shape of a square bar 56 extending into mirror housing 16 via an opening 58. As shown, bar 56 is manufactured separately and secured to base member 12, although bar 56 could be formed integral with base member 12, if desired. Bar 56 preferably is non-circular and has at least one planar side, and as shown in its preferred embodiment has a square cross-section. This feature helps preclude unwanted rotation of mirror housing 16 relative to bar 18, as will be described below.

A compression spring 60 is held in place by a stop 62 and a threaded bolt 64. Slide members 66, 68 are disposed between spring 60 and mirror housing 16. Alternate stop 62a (see FIG. 5) includes optional connectors 70, 72 for operatively connecting base member 12 (via stop 62a and bar 56) to an actuator or actuators (see indicated actuators $A_1$ and $A_2$) secured to mirror housing 16. Mating spherical surface 54 of mirror housing 16 may be disposed within a cup section 74 extending into mirror housing 16, if desired, to conserve space and to protect the interface between mirror housing 16 and base member 12.

Threaded bolt 64 passes through an opening 76 in stop 62 and is secured within a threaded hole 78 in bar 56 (see FIG. 2A). Bar 56 passes through opening 58 in mirror housing 16 and also through an opening 80 in slide member 66 and another opening 82 in slide member 68. Opening 82 is extended in the form of a slot.

Slide member 66 includes a bearing surface 84 for contacting compression spring 60 on one side and a spherical surface 86 for contacting slide member 68 on the other side. Grooves 88 are defined in spherical surface 86 on either side of opening 80. Slide member 68 includes two substantially concentric spherical surfaces 90,92. Opposite mating surface 54 of mirror housing 16 is a spherical surface 98, which defines grooves 100. When assembled, ridges 96 are disposed in grooves 100, and ridges 94 are disposed in grooves 88 to thereby form pairs of mating elements. Grooves 88 and 100 are disposed perpendicular to each other, relative to an axis extending though the center of bar 56. Mirror housing 16 may pivot in the direction of any of arrows 102, 104, 106, or 108 by sliding a pair of ridges through a respective pair of grooves. Also, mirror housing 16 may simultaneously pivot in the direction of both of two adjacent arrows (for example arrows 102 and 104) by sliding both pairs of ridges through respective pairs of grooves. Thus, mirror housing 16 is biaxially adjustable relative to base member 12 and mirror mounting bar 18 by use of mating elements.

Figure 3A:
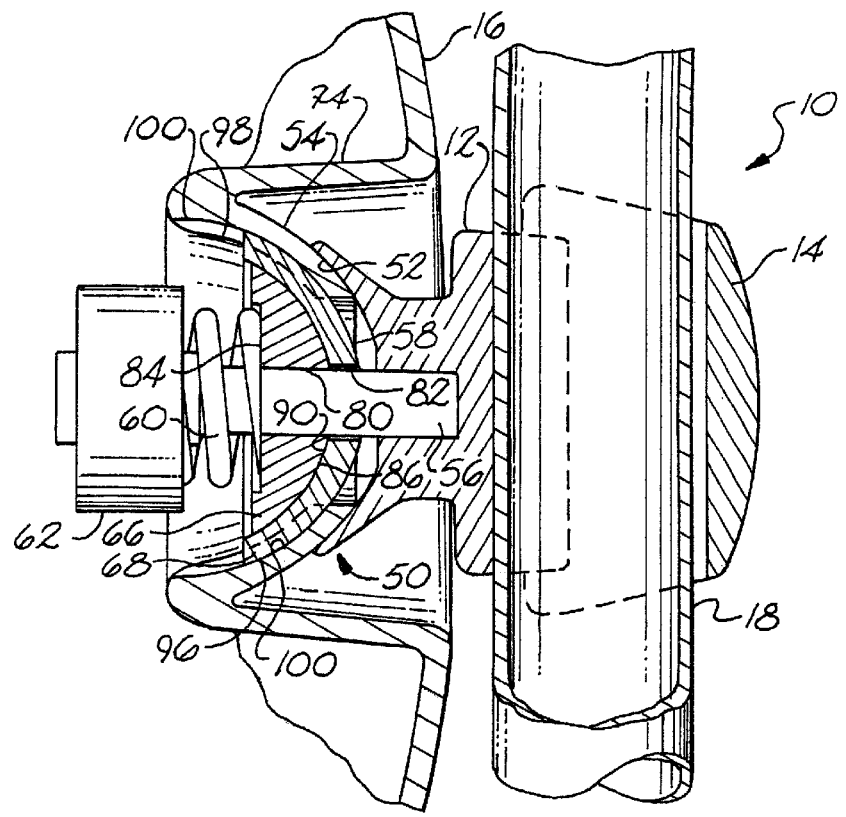
FIG. 3A is a sectional view of the mirror mounting assembly taken along line 3A—3A in FIG. 1.

Due to the mating exterior shape (in this case square) of bar 56 and a seat 110 on stop 62, stop 62 is not rotatable relative to base member 12. Also, the square opening 80 in slide member 66 prevents bar 56 from rotating relative to slide member 66. The mating elements (ridges and grooves) preclude relative rotation between slide members 66 and 68, and between slide member 68 and mirror housing 16. The rectangular shape of opening 82 also prevents rotation between bar 56 and slide member 68. Thus, the present invention by several complimentary elements and interconnections reliably precludes rotation of mirror housing 16 relative to mounting bar 18. As shown in FIGS. 2A and 3A, cup section 74 contacts a base member 12 before bar 56 reaches an edge of openings 58 or 82, thereby preventing potential damage to these openings by inadvertent attempts to over-adjust mirror housing 16.

Figure 2B:
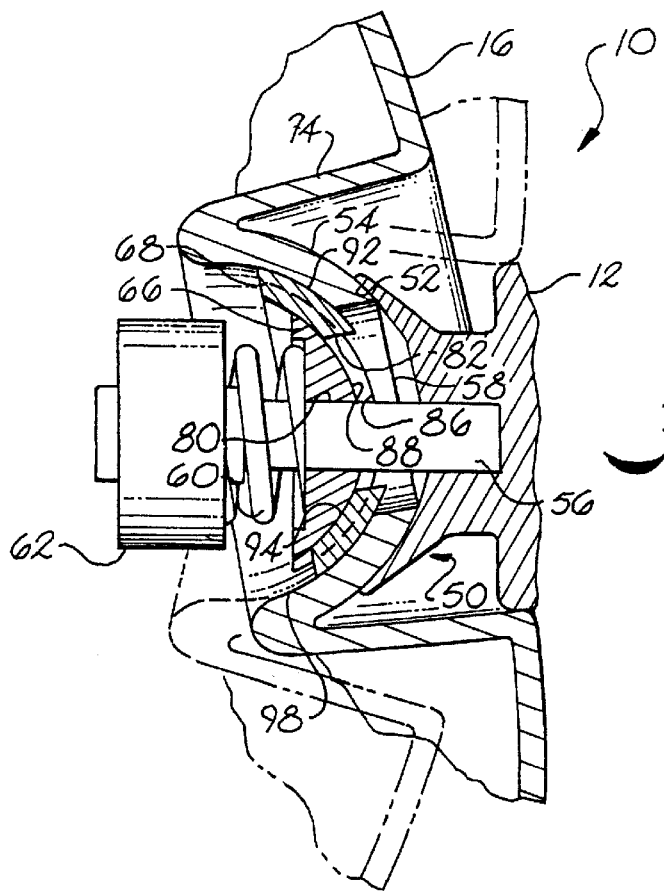
FIG. 2B is a sectional view as in FIG. 2A, with the mirror housing rotated relative to the base member.
Figure 3B:
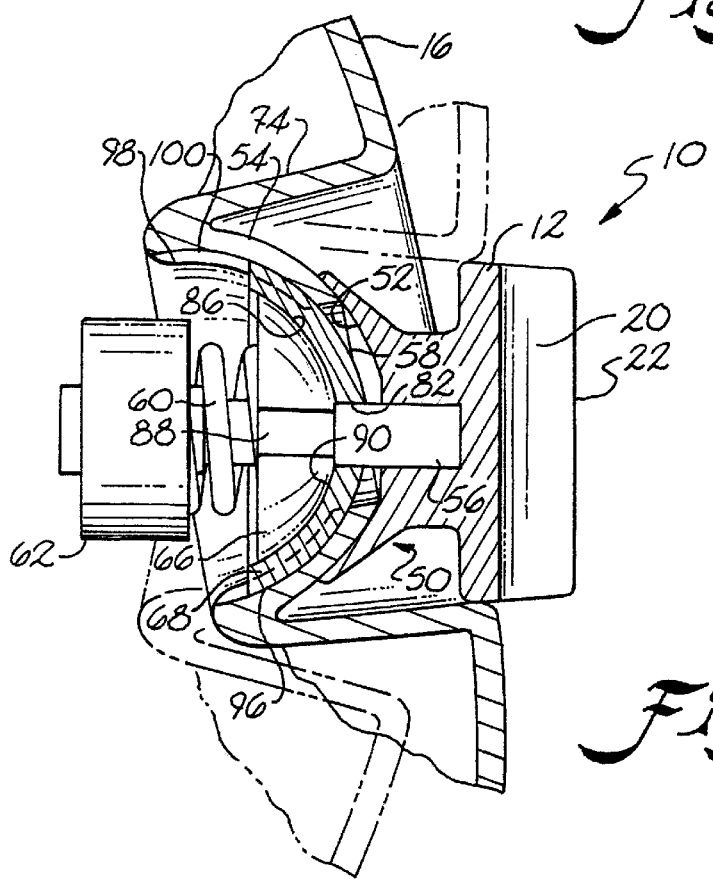
FIG. 3B is a sectional view as in FIG. 3A, with the mirror housing rotated relative to the base member.
Figure 4:
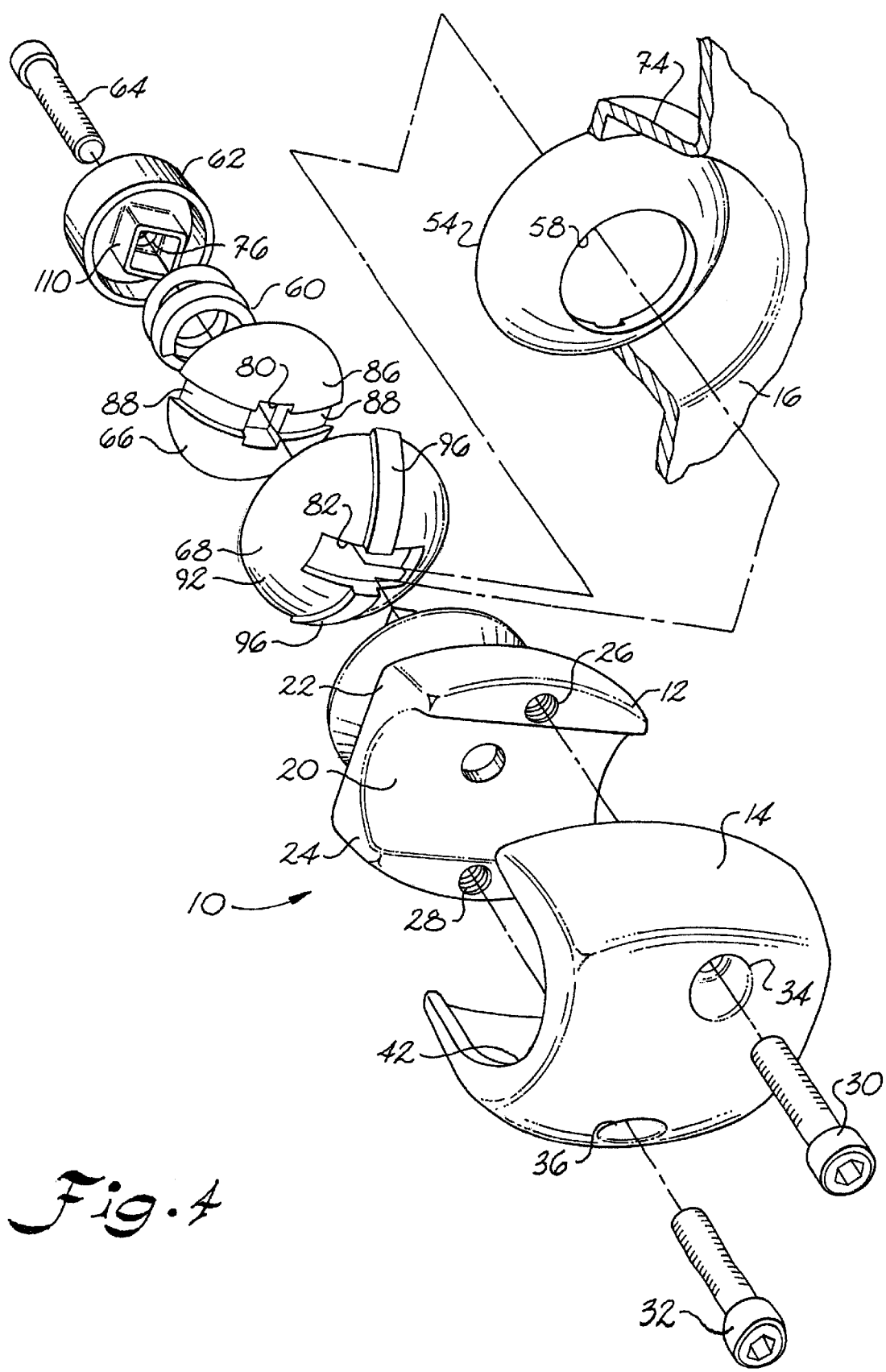
FIG. 4 is a front perspective exploded view of the mirror mounting assembly as in FIG. 1.
Figure 5:
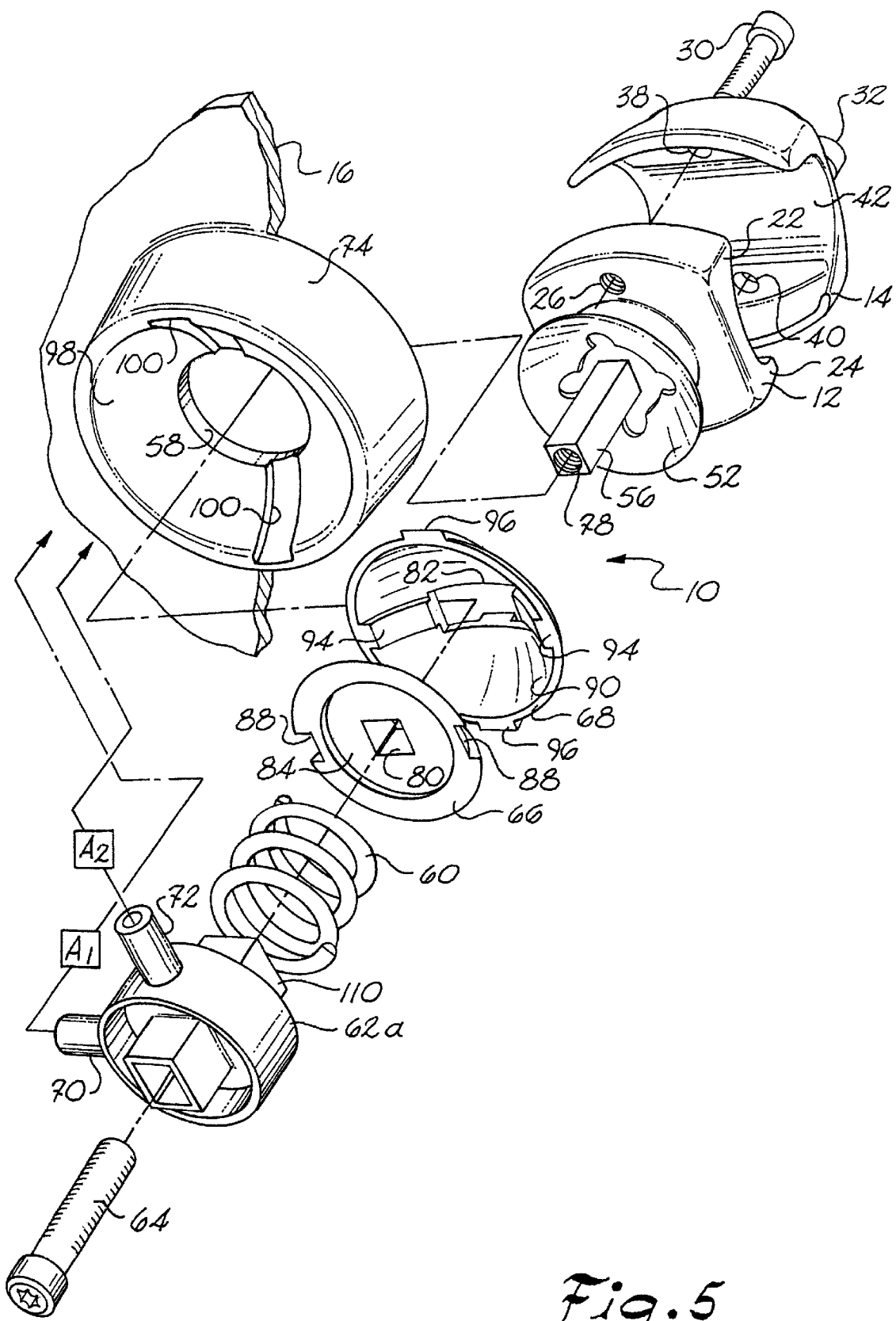
FIG. 5 is a rear perspective exploded view of the mirror mounting assembly as in FIG. 4, also showing an alternative stop member for attachment to two actuators mounted to the mirror housing.

FIGS. 2A and 3A show cross-sections a device embodying the present invention from different (perpendicular) viewpoints (see arrows 2A and 3A in FIG. 1). The position of mirror housing 16 shown in solid lines in FIG. 2B is that which would be achieved by moving housing in the direction of arrow 108, with the dotted line representation indicating movement in the direction of arrow 104. Similarly, the mirror housing position shown in solid lines in FIG. 3B represents movement in the direction of arrow 106, and the dotted line position represents movement in the direction of arrow 102. Thus, the present invention allows relative pivoting movement in either of two perpendicular directions, or both, while preventing undesired rotation.

Base member 12 and cap member 14 are preferably made of a cast metal such as aluminum, although both could be made of a plastic such as nylon, if desired. Slide members 66, 68 are preferably made of a plastic such as nylon. Housing 16 is preferably made of a plastic such as a.b.s. The materials selected should allow for secure and reliable attachment together and resist movement once so secured. The strength of the compression spring should be strong enough to hold the mirror housing in place, yet allow for adjustment, whether manual or via actuator(s). If desired, frictional coatings or surface treatments may be used to alter frictional characteristics to optimize performance.

It will be apparent to those skilled in the art that various modifications and variations can be made in the present invention without departing from the scope and spirit of the invention. For example, the relative position of mating elements (grooves and ridges) on opposing parts could be reversed. Also, the cross-sectional shape of bar 56 and the mating elements (grooves and ridges) could be altered from that depicted, as long as their described and depicted functions are preserved. It is intended that the present invention include such modifications and variations as come within the scope of the appended claims and their equivalents.

We claim:

1. A mirror mounting assembly for mounting a mirror glass to a mounting bar, the mirror mounting assembly comprising:

a base member for attachment to the mounting bar and defining a spherical surface;

a first slide member secured to the base member and defining a spherical surface;

a mirror housing for supporting the mirror glass disposed between the first slide member and the base member, the mirror housing defining a first spherical surface contacting the spherical surface of the base member and a second spherical surface opposite the first spherical surface;

a second slide member slidably secured to the base member disposed between the first slide member and the mirror housing, the second slide member defining a first spherical surface contacting the spherical surface of the first slide member and a second spherical surface contacting the second spherical surface of the mirror housing;

a first set of mating elements disposed on the spherical surface of the first slide member and the first spherical surface of the second slide member for limiting relative sliding between the first and second slide members to a first given orientation; and a second set of mating elements disposed on the second spherical surface of the second slide member and the second spherical surface of the mirror housing for limiting relative sliding between the second slide member and the mirror housing to a second given orientation perpendicular to the first given orientation.

2. The mirror mounting assembly of claim 1, wherein the first set of mating elements includes a groove disposed in one of the first slide member and the second slide member and a ridge disposed in the other of the first slide member and the second slide member.

3. The mirror mounting assembly of claim 1, wherein the second set of mating elements includes a groove disposed in one of the second slide member and the mirror housing and a ridge disposed in the other of the second slide member and the mirror housing.

4. The mirror mounting assembly of claim 1, further including a compression spring secured to the base member for urging together the first slide member, the second slide member, the mirror housing, and the base member.

5. The mirror mounting assembly of claim 1, wherein the base member includes an extending portion extending nonrotatably through an opening in the first slide member.

6. The mirror mounting assembly of claim 5, wherein the extending portion of the base member extends nonrotatably through an opening in the second slide member.

7. The mirror mounting assembly of claim 5, wherein the extending portion of the base member extends through an opening in the mirror housing.

8. The mirror mounting assembly of claim 5, wherein the extending portion of the base member has a square cross-section.

9. The mirror mounting assembly of claim 1, further including at least one actuator mounted to the mirror housing and the base member for moving the mirror housing relative to the base member.

10. The mirror mounting assembly of claim 1, further including a mirror glass secured to the mirror housing.

11. The mirror mounting assembly of claim 1, further including a cap member for securing the base member to the mounting bar.

12. The mirror mounting assembly of claim 1, wherein the mirror housing includes a recessed cup portion, and the first spherical surface is disposed at a base of the cup portion.

* * * * *